United States Patent [19]

Di Lascio

[11] Patent Number: 4,502,371
[45] Date of Patent: Mar. 5, 1985

[54] COFFEE PERCOLATOR PROVIDED WITH A DEVICE FOR DELIVERING COFFEE INFUSION AS WELL AS STEAM

[76] Inventor: Donato Di Lascio, Via Per Armeno 8, 28010 Miasino (Novara), Italy

[21] Appl. No.: 582,703

[22] Filed: Feb. 23, 1984

[30] Foreign Application Priority Data

Feb. 28, 1983 [IT] Italy .............................. 20956/83[U]

[51] Int. Cl.³ .............................................. A47J 31/30
[52] U.S. Cl. .................................... 99/293; 99/302 R; 126/369
[58] Field of Search .................. 99/279, 313, 314, 315, 99/308, 309, 310, 323, 302 R, 288, 291, 293, 296, 298, 303, 311, 312; 426/433; 126/348, 369.1, 373, 369

[56] References Cited

U.S. PATENT DOCUMENTS

| | | | |
|---|---|---|---|
| 699,495 | 5/1902 | Dallinger | 99/302 R |
| 1,619,967 | 3/1927 | Bontempi | 99/314 |
| 2,687,077 | 8/1954 | Regina | 99/313 |

FOREIGN PATENT DOCUMENTS 849297  8/1939  France .................................. 99/314

*Primary Examiner*—Robert W. Jenkins
*Attorney, Agent, or Firm*—Oblon, Fisher, Spivak, McClelland & Maier

[57] ABSTRACT

The coffee percolator is of the type including a bottom container acting as a boiler and support for a removable coffee-holder funnel and is characterised in that it further comprises a top element which can be sealingly mounted on said bottom container and is provided with a spout for outside delivery of coffee infusion or steam, as well as valve means associated with said spout for maintainment at a open position of said spout for coffee infusion delivery and at a controlled closed position of the same spout for steam delivery.

More particularly, the valve means comprises a shutter associated with a control lever for maintainment at a first position corresponding to a constant opening of the spout and moved to a second position corresponding to a constant closure of the same spout, and then to a third position controlling the opening and the closing of the spout for the delivery of the steam.

3 Claims, 2 Drawing Figures

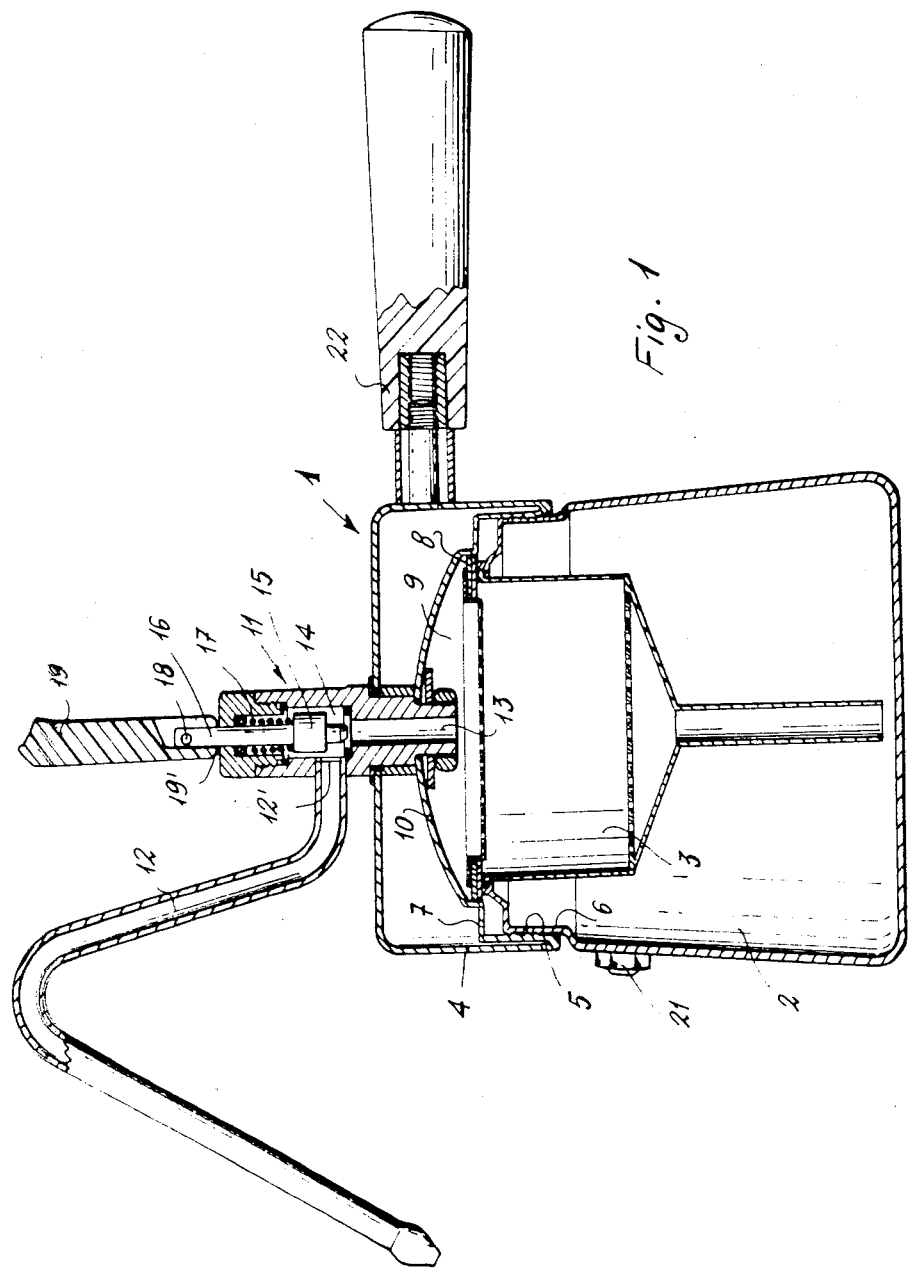

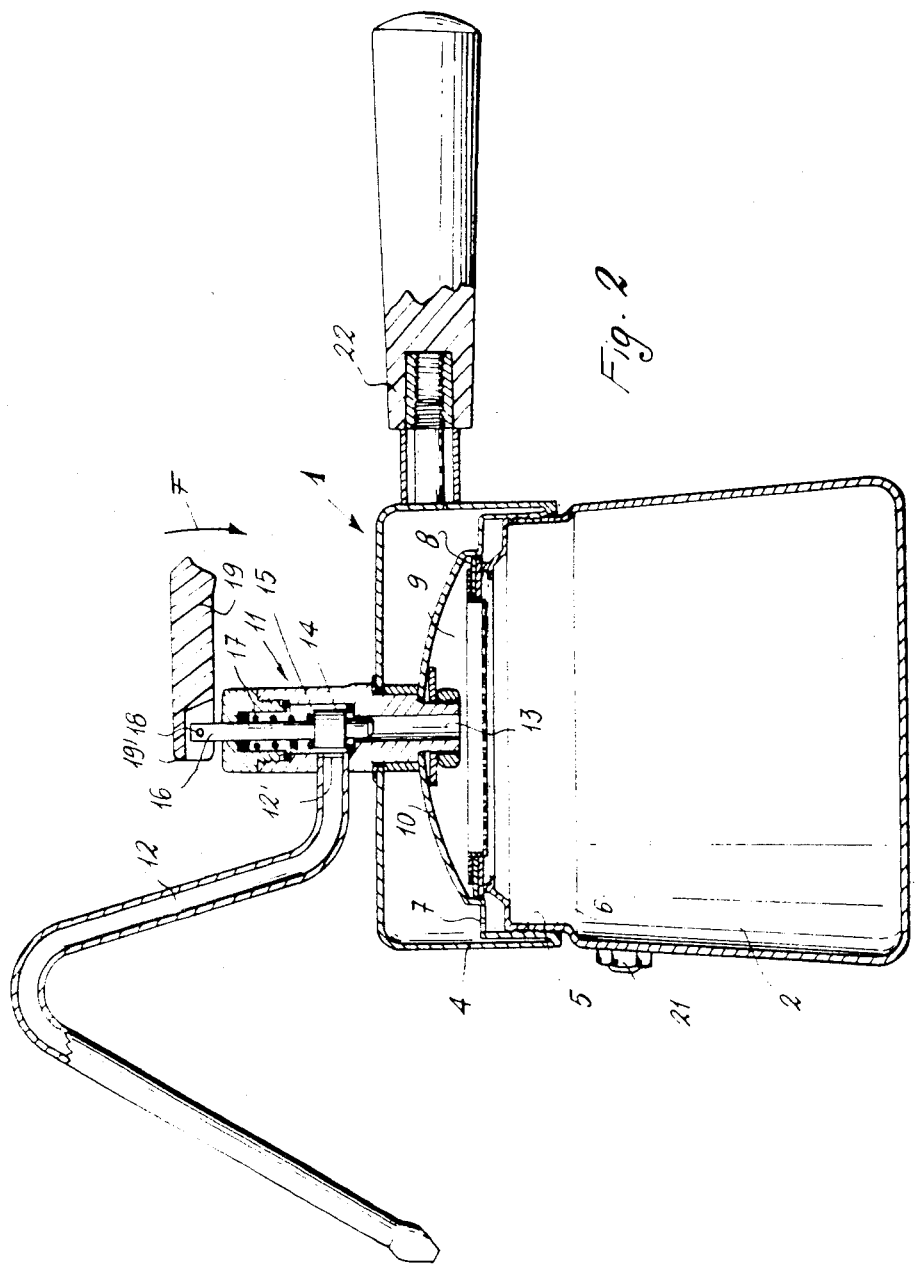

COFFEE PERCOLATOR PROVIDED WITH A DEVICE FOR DELIVERING COFFEE INFUSION AS WELL AS STEAM

FIELD OF THE INVENTION

The present invention relates to a coffee percolator, and more particularly to a device associated to said coffee percolator for allowing the delivery at will of coffee infusion or steam.

BACKGROUND OF THE INVENTION

Coffee percolators at present commercially available comprise a bottom container acting as a boiler and a top container acting as coffee infusion collector. A coffee-holder funnel is arranged within the bottom container and communicates with the top container through a filter.

Owing to the structure thereof, such conventional coffee percolators do not allow the production of steam solely for use, for example, in heating other drinks.

SUMMARY OF THE INVENTION

The object of the invention is to provide a coffee percolator suitably structured for the production at will of coffee infusion as well steam solely.

According to the invention, the coffee percolator is of the type including a bottom container acting as a boiler and support for a removable coffee-holder funnel and is characterised in that it further comprises a top element which can be sealingly mounted on said bottom container and is provided with a spout for outside delivery of coffee infusion or steam, as well as valve means associated with said spout for maintainment at a open position of said spout for coffee infusion delivery and at a controlles closed position of the same spout for steam delivery.

More particularly, the valve means comprises a shutter associated with a control lever for maintainment at a first position corresponding to a constant opening of the spout and moved to a second position corresponding to a constant closure of the same spout, and then to a third position controlling the opening and the closing of the spout for the delivery of the steam.

The novel features which are considered as characteristic of the invention are set forth in particular in the appended claims. The coffee percolator itself, however, both as to its construction and its mode of operation, together with additional features and advantages thereof, will be best understood upon perusal of the following detailed description of a specific embodiment with reference to the accompanying drawings.

BRIEF DESCRIPTION OF THE DRAWINGS

FIG. 1 is a sectional view of the coffee percolator predisposed for the delivery of coffee infusion; and FIG. 2 is a sectional section of the coffee percolator for the delivery of steam solely.

DESCRIPTION OF THE PREFERRED EMBODIMENT

Referring to the drawings, there is shown a coffee percolator, generally designated at 1, conventionally comprising a bottom container 2, acting as a boiler, in which a coffee-holder funnel 3 is removably mounted. A top element 4 has a threading 5 adapt to cooperate with a threading 6 provided on the upper edge of the container 2 and said top element is internally provided with a peripheral circular flange 7 supporting a gasket 8 between the edge of said funnel 3 and a chamber 9 defined by a top cap 10 integral with said flange 7. A valve unit, generally designated at 11, projects upwardly from the cap 10 and has a spout 12 branching off therefrom.

The valve unit 11 has an axial passage 13 opening at the bottom in said chamber 9 and at the top in another chamber 14 containing a shutter 15 associated with a stem 16 and cooperating with a spring 17. The chamber 14 communicates with the spout 12 through an inlet 12'. The free end of the stem 16 projects from the valve unit 11 and carries, pivoted at 18, a control lever 19 having camfered lower edges 19'.

The pivot 18 is so disposed relative to the edges 19' that with lever 19 at vertical position, as shown in FIG. 1, the spring 17 is compressed and the shutter 15 is in an upper position so as not to close the spout inlet 12' and with lever 19 at horizontal position, as shown in FIG. 2, the spring 17 is expanded and the shutter 15 is in a lower position so as to close said spout inlet 12'.

The coffee percolator is completed by a conventional safety valve 21 and handgrip 22.

The coffee infusion delivery is conventionally carried out maintaining the lever 19 at vertical position. Thus operating, the shutter 15 is lifted relative to the spout inlet 12' and the infusion is free to pass through the axial passage 13 and emerge out of the spout 12 for collection in a cup or the like (not shown).

For the delivery of steam solely throught the spout 12, for example in order to heat another drink, the coffee-holder funnel 3 is removed and, after the top element 4 is closed, the control lever 19 is brought to horizontal position so that the spring 17 will maintain the shutter 15 at closed position of the spout inlet 12'.

As the water in container 2 comes to boils, pressure steam passes through passage 13 and acts upon said shutter 15 which, by small oscillations resisted by the spring 17, will signal to the operator presence of steam; the continued lowering of lever 19 (arrow F, FIG. 2) will cause shutter 15 to be lifted and, as a result, the continuous passage of steam through the spout 12. The operation of the lever 19, of course, shall occur at sufficient intervals to build up a sufficient steam pressure within the container 2 and chamber 9.

From the foregoing, it is now apparent that a coffee percolator with the associated valve unit 11 meets the object set out hereinabove, as well others and that changes may be made to the particular arrangements, shapes and details of components utilized. Variances in the coffee percolator and associated valve unit may be made by those skilled in the art without departing from the spirit and scope of the invention, as set out in the claims which follow.

What I claim is:

1. A coffee percolator comprising in combination:
   a bottom container acting as a boiler;
   a coffee-holder funnel removably mounted within said bottom container;
   a top element sealingly mounted on said bottom container having a top cap defining a chamber above said removable coffee-holder funnel;
   a valve unit outwardly projecting from said cap and having an axial passage;
   a shutter movable along said axial passage;
   a spout branching off from said valve unit having an inlet opening in said axial passage; and means associated to said valve unit for shifting said shutter from a lower position in which the shutter closes said spout inlet to an upper position in which the same shutter does not close the same spout inlet.

2. A coffee percolator according to claim 1, wherein said means associated to the valve unit comprises a stem carrying at one end said shutter and having pivoted at the other end a control lever, spring means being interposed between said shutter and said control lever.

3. A coffee percolator according to claim 2, wherein said control lever has lower chamfered edges, the pivot point of the control lever on said stem being so disposed relative to said chamfered edges that with lever at vertical position said spring is compressed and the shutter is in said upper position and with lever at horizontal position the same spring is expanded and the shutter in said lower position.

* * * * *